(12) United States Patent
Hunt

(10) Patent No.: US 8,713,101 B2
(45) Date of Patent: Apr. 29, 2014

(54) DECENTRALIZED PROCESSING NETWORK

(75) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 492 days.

(21) Appl. No.: 12/477,021

(22) Filed: Jun. 2, 2009

(65) Prior Publication Data

US 2010/0306481 A1 Dec. 2, 2010

(51) Int. Cl.
*G06F 15/16* (2006.01)
*H04J 14/02* (2006.01)
*H04J 14/08* (2006.01)
*H04B 10/00* (2013.01)
*G06F 12/00* (2006.01)

(52) U.S. Cl.
USPC ........... 709/204; 709/205; 709/206; 709/208; 398/96; 398/103; 398/118; 711/105

(58) Field of Classification Search
USPC ................ 709/204–210; 367/15–20, 134
See application file for complete search history.

(56) References Cited

U.S. PATENT DOCUMENTS

| | | | |
|---|---|---|---|
| 6,822,305 B2 | 11/2004 | Hunt | |
| 6,850,359 B2 | 2/2005 | Hunt et al. | |
| 6,897,998 B2 | 5/2005 | Nee et al. | |
| 7,154,658 B2 | 12/2006 | Maram et al. | |
| 7,512,037 B2 * | 3/2009 | Frodyma et al. | 367/134 |
| 7,577,257 B2 * | 8/2009 | Xia et al. | 380/278 |
| 7,755,971 B2 * | 7/2010 | Heatley et al. | 367/16 |
| 2004/0076164 A1 * | 4/2004 | Vanderveen et al. | 370/400 |
| 2006/0227664 A1 * | 10/2006 | Horak | 367/136 |
| 2007/0014189 A1 * | 1/2007 | Basilico | 367/128 |
| 2008/0144442 A1 * | 6/2008 | Combee et al. | 367/131 |
| 2008/0215551 A1 * | 9/2008 | Van Den Boomen et al. | 707/3 |
| 2008/0279047 A1 * | 11/2008 | An et al. | 367/134 |

* cited by examiner

*Primary Examiner* — Ranodhi Serrao
*Assistant Examiner* — Farrukh Hussain
(74) *Attorney, Agent, or Firm* — Klintworth & Rozenblat IP LLC

(57) ABSTRACT

A free-space, decentralized, distributed computing network may comprise at least one free-space dynamic memory unit, at least one free-space processing unit, at least one free-space static memory unit, and at least one free-space communications link. The free-space dynamic memory unit may store data. The free-space processing unit may process the data, stored by the free-space dynamic memory unit, into information. The free-space static memory unit may provide operational instructions to the free-space dynamic memory unit and to the free-space processing unit. The free-space communications link may connect in the free-space the free-space dynamic memory unit, the free-space processing unit, and the free-space static memory unit. The free-space dynamic memory unit, the free-space processing unit, and the free-space static memory unit may each comprise at least one tracking device, and a transducer, transmitter, and/or receiver.

18 Claims, 2 Drawing Sheets

DECENTRALIZED PROCESSING NETWORK

FIELD OF THE INVENTION

The disclosure relates to free-space, decentralized, distributed computing networks and to methods of forming and using such networks.

BACKGROUND OF THE DISCLOSURE

Heritage systems used throughout the aerospace and defense communities may be based on point-to-point, physically co-located, computing architectures. That is, all of the computing hardware required to process information over a computing network may be located within each respective platform, comprising a physically bounded entity in operational space, such as a plane, a boat, a vehicle, a satellite, a soldier, and/or another type of platform. Each respective platform may include all of the hardware required for each platform to independently have complete computational ability without relying on other platforms. Such computing systems may experience hardware redundancies, inefficient networking capabilities, and substantial platform weight, volume, and complexity. Moreover, by requiring each platform to have individual, complete, non-shared computational ability, communication between multiple platforms may lead to the abbreviation of data sets. This may lead to inaccuracy and/or unreliability of information communicated over the network.

Typically, the term 'distributed computing' implies that a program is split into parts that run simultaneously on multiple computers communicating over a network. When defined this way, distributed computing may comprise a subset of parallel computing. However, parallel computing generally describes program parts running simultaneously on multiple processors in the same computer. Distributed programs may have to work in different computer environments with network links and unpredictable failures in the network or the computers. This typically only involves the separation of software or algorithms. In other words, there may be distribution of the computer hardware within cyberspace, but individual elements of the computer may still be duplicated at different physical positions. Networking between elements of the computer may be enabled by optical communication through optical fiber. The use of optical fiber implies that no external alignment is necessary. If free-space communications are used to network the elements of the computer, there may need to be additional hardware and controls to assure that the physically separated elements have their communications hardware aligned to allow information to be propagated from one location to another.

The instant disclosure involves the physically dispersed elements of at least one computational system, not merely the dispersal of software or computational function. In this physically dispersed computation, the nature of the interaction between the computers that execute computations is of prime importance. In order to be able to use the widest possible variety of hardware configurations, the communication channel must be controlled well enough to allow for data links to stay connected for finite lengths of time. If not planned properly, a distributed system can decrease the overall reliability of computations if the unavailability of a node can cause disruption of the other nodes. This is why it is important for the distributed system to be able to find the necessary pieces in the network for basic operation. Computation will not work in this distributed environment without the necessary elements. This is likely due to the amount of network communication or synchronization that would be required between nodes. If bandwidth, latency, or communication requirements are too significant, then the benefits of distributed computing may be negated and the performance may be worse than a non-distributed environment.

A network, and a method of network formation and use, is needed which may solve one or more problems of one or more of the conventional networks and/or methods.

SUMMARY OF THE DISCLOSURE

In one embodiment, a free-space, decentralized, distributed computing network is disclosed. The free-space, decentralized, distributed computing network may comprise at least one free-space dynamic memory unit, at least one free-space processing unit, at least one free, space static memory unit, and at least one free-space communications link. The at least one free-space dynamic memory unit may store data. The at least one free-space processing unit may process the data, stored by the at least one free-space dynamic memory unit, into information. The at least one free-space static memory unit may provide operational instructions to the at least one free-space dynamic memory unit and to the at least one free-space processing unit. The at least one free-space communications link may connect in the free-space the at least one free-space dynamic memory unit, the at least one free-space processing unit, and the at least one free-space static memory unit. The at least one free-space dynamic memory unit, the at least one free-space processing unit, and the at least one free-space static memory unit may each comprise: (1) at least one of: (i) a transducer; and (ii) a transmitter and a receiver; and (2) at least one tracking device.

In another embodiment, a method of forming and using a free-space, decentralized, distributed computing network is disclosed. In one step, at least one free-space dynamic memory unit, at least one free-space processing unit, and at least one free-space static memory unit may be provided. The at least one free-space dynamic memory unit, the at least one free-space processing unit, and the at least one free-space static memory unit may each comprise: (1) at least one of: (i) a transducer; and (ii) a transmitter and a receiver; and (2) at least one tracking device. In another step, the at least one free-space dynamic memory unit, the at least one free-space processing unit, and the at least one free-space static memory unit may be connected using at least one free-space communications link. In an additional step, data may be stored using the at least one free-space dynamic memory unit. In yet another step, operational instructions may be provided, over the at least one free-space communications link using the at least one free-space static memory unit, to the at least one free-space dynamic memory unit and to the at least one free-space processing unit. In another step the data stored by the at least one free-space dynamic memory unit may be sent, over the at least one free-space communications link, to the at least one free-space processing unit. In an additional step, the data stored by the at least one free-space dynamic memory unit may be processed into information using the at least one free-space processing unit.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
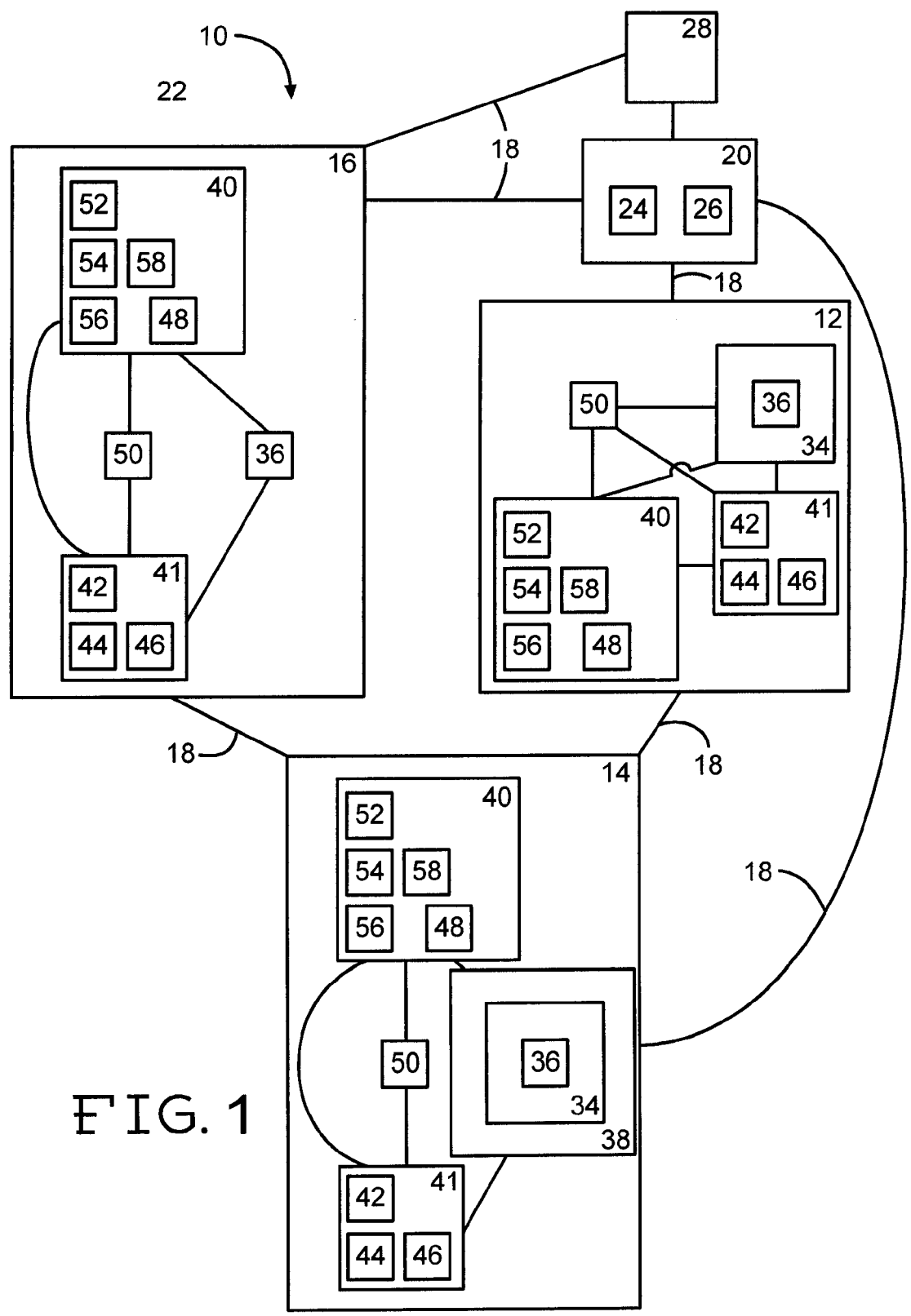
FIG. 1 illustrates a box diagram of one embodiment of a free-space, decentralized, distributed computing network.

FIG. 1 illustrates a box diagram of one embodiment of a free-space, decentralized, distributed computing network 10. The free-space, decentralized, distributed computing network 10 may include: at least one free-space-dynamic memory unit 12; at least one free-space processing unit 14; at least one free-space static memory unit 16; at least one free-space communications link 18; and at least one free-space sensor 20. Each of the components 12-20 may be geographically dispersed in free-space 22 relative to one another, and may be ground-based, air-based, water-based, and/or space-based. In other embodiments, the configurations of the free-space, decentralized, distributed computing network 10 may vary, different numbers of the components 12-20 may be used, and/or other types and/or numbers of components may be used.

The at least one free-space sensor 20 may comprise one or more spectral sensors 24, one or more imaging sensors 26, and/or other types of sensors. The at least one free-space sensor 20 may be adapted to sense at least one target 28, such as a friendly aircraft, a hostile aircraft, and/or other type of target.

The at least one free-space communications link 18 may be adapted to connect in the free-space 22 the at least one free-space-dynamic memory unit 12; the at least one free-space processing unit 14; the at least one free-space static memory unit 16; and the at least one free-space sensor 20. The free-space communications link 18 may comprise an optical laser, a radio frequency link, and/or other types of communications devices and/or links.

The at least one free-space dynamic memory unit 12 may be adapted to store data 34 received from at least one of the at least one free-space sensor 20, the at least one free-space communications link 18, the at least one free-space static memory unit 16, and the at least one free-space processing unit 14. The data 34 may comprise data regarding the target 28 acquired by the at least one free-space sensor 20. The data 34 may also comprise operational instructions 36 provided by the at least one free-space static memory unit 16.

The at least one free-space processing unit 14 may be adapted to process the data 34 stored by the at least one free-space dynamic memory unit 12 into information 38. The at least one free-space static memory unit 16 may be adapted to provide the operational instructions 36 to the at least one free-space dynamic memory unit 12, and/or to the at least one free-space processing unit 14.

Each of the at least one free-space dynamic memory unit 12, the at least one free-space processing unit 14, and the at least one free-space static memory unit 16 may comprise at least one tracking device 40, and a communication device 41 comprising at least one of a transducer 42, a transmitter 44, and a receiver 46. The transducer 42, and/or transmitter 44 and receiver 46 may be used for transmitting and receiving, over the at least one free-space communications link 18, at least one of the operational instructions 36, the data 34, the information 38, a signal 48 from the at least one tracking device 40, and free-space sensor data 50.

The at least one tracking device 40 may be adapted to track at least one of the at least one free-space static memory unit 16, the at least one free-space processing unit 14, the at least one free-space dynamic memory unit 12, and the at least one free-space sensor 20. The at least one tracking device 40 may utilize one or more of the transducer 42, the transmitter 44, and the receiver 46 for tracking. The at least one tracking device 40 may also comprise one or more of a tracking device transducer 52, a tracking device transmitter 54, a tracking device receiver 56, and integrated mechanical and electrical subsystems 58 for at least one of passively and actively controlling operation of the at least one tracking device 40. In such manner, the at least one tracking device 40 may conduct tracking using one or more of the transducer 42, the transmitter 44, the receiver 46, the tracking device transducer 52, the tracking device transmitter 54, the tracking device receiver 56, and the integrated mechanical and electrical subsystems 58.

Figure 2:
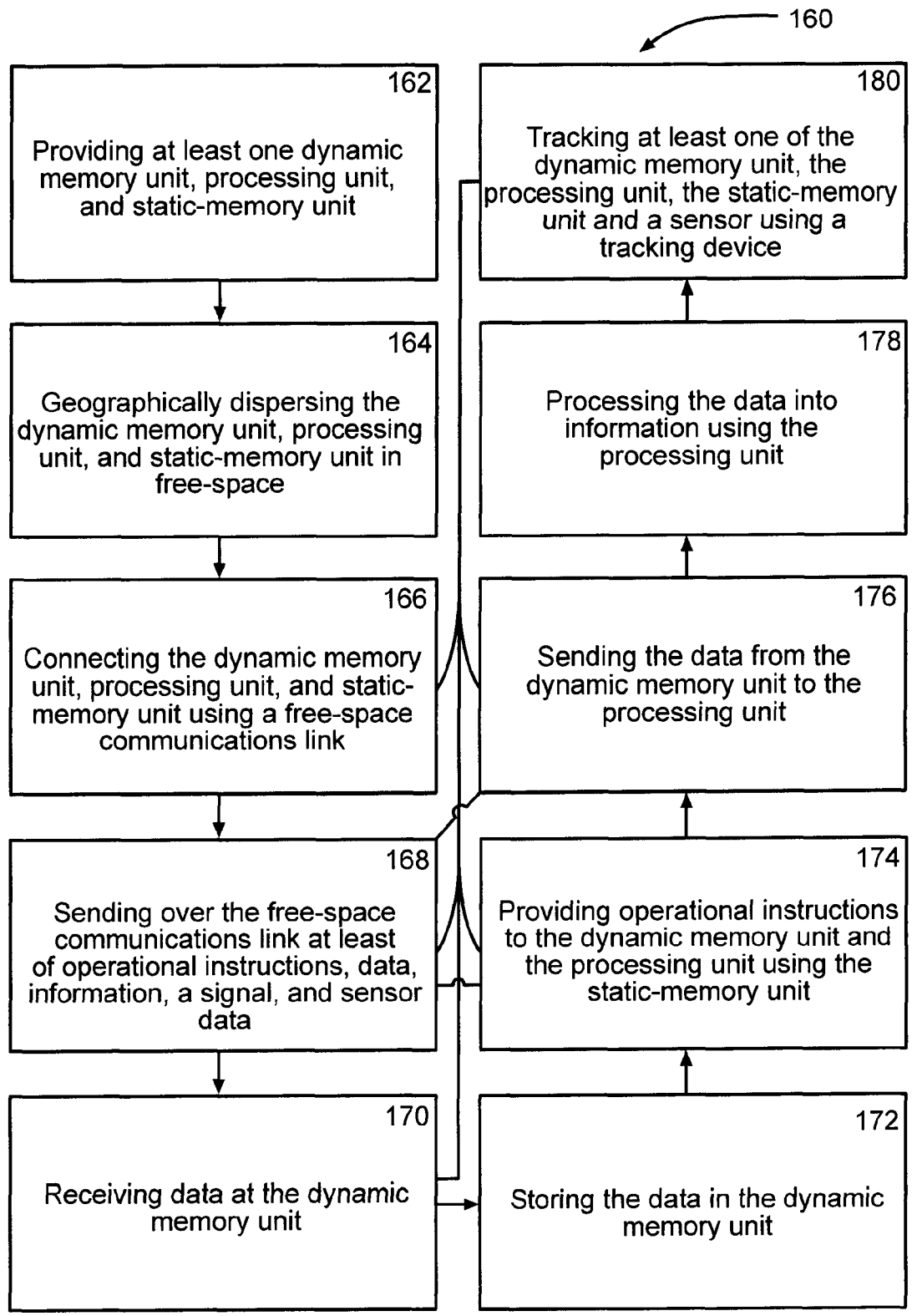
FIG. 2 illustrates a flowchart of one embodiment of a method of forming and using a free-space, decentralized, distributed computing network.

FIG. 2 illustrates a flowchart of one embodiment of a method 160 of forming and using a free-space, decentralized, distributed computing network 10. In step 162, at least one free-space dynamic memory unit 12, at least one free-space processing unit 14, and at least one free-space static memory unit 16 may be provided. Each of the at least one free-space dynamic memory unit 12, the at least one free-space processing unit 14, and the at least one free-space static memory unit 16 may comprise at least one tracking device 40, and at least one of a transducer 42, a transmitter 44, and a receiver 46.

In step 164, the at least one free-space dynamic memory unit 12, the at least one free-space processing unit 14, and the at least one free-space static memory unit 16 may be geographically dispersed in free-space 22. In step 166, the at least one free-space dynamic memory unit 12, the at least one free-space processing unit 14, and the at least one free-space static memory unit 16 may be connected using at least one free-space communications link 18. The free-space communications link 18 may comprise an optical laser, a radio frequency link, and/or other types of communications devices and/or links. Step 166 may further comprise connecting at least one free-space sensor 20 to the at least one free-space dynamic memory unit 12, the at least one free-space processing unit 14, and the at least one free-space static memory unit 16 using the at least one free-space communications link 18. The at least one free-space sensor 20 may comprise one or more spectral sensors 24, one or more imaging sensors 26, and/or other types of sensors.

In step 168, the at least one of the transducer 42, the transmitter 44, and the receiver 46 may transmit and/or receive, over the at least one free-space communications link 18, at least one of operational instructions 36, data 34, information 38, a signal 48 from the at least one tracking device 40, and free-space sensor data 50. Step 168 may be used in conjunction with any of steps 170, 174, 176, and 180 provided below.

In step 170, the at least one free-space dynamic memory unit may receive the data 34 from at least one of the at least free-space sensor 20, the at least one free-space communications link 18, the at least one free-space static memory unit 16, and the at least one free-space processing unit 14. The data 34 may comprise data regarding a target 28, such as a friendly aircraft, a hostile aircraft, and/or other type of target, acquired by the at least one free-space sensor 20. The data 34 may also comprise the operational instructions 36 provided by the at least one free-space static memory unit 16.

In step 172, the data 34 may be stored using the at least one free-space dynamic memory unit 12. In step 174, the operational instructions 36 may be provided, over the at least one free-space communications link 18 using the at least one free-space static memory unit 16, to the at least one free-space dynamic memory unit 12 and to the at least one free-space processing unit 14. In step 176, the data 34 stored by the at least one free-space dynamic memory unit 12 may be sent, over the at least one free-space communications link 18, to the at least one free-space processing unit 14. In step 178, the data 34 stored by the at least one free-space dynamic memory unit 12 may be processed into the information 38 using the at least one free-space processing unit 14

In step 180, at least one of the at least one free-space static memory unit 16, the at least one processing unit 14, the at least one dynamic memory unit 12, and the at least one free-space sensor 20 may be tracked using the at least one tracking device 40. The at least one tracking device 40 may comprise one or more of a tracking device transducer 52, a tracking device transmitter 54, a tracking device receiver 56, and integrated mechanical and electrical subsystems 58 for at least one of passively and actively controlling operation of the at least one tracking device 40. The at least one tracking device 40 may also utilize one or more of the transducer 42, the transmitter 44, and the receiver 46. Step 180 may be used in conjunction with any of steps 166, 168, 170, 174, and 176 provided above. In other embodiments, any of the steps 162-180 of the method 160 may be modified, not-followed, changed in order, and/or other types of steps may be added.

One or more embodiments of the disclosure may provide for a networking having geographically distributed, decentralized, processing/computational ability, as may be required in a network centric computational environment applicable to a network based battle-space. By using decentralized processing, substantial network hardware redundancies may be avoided. Networking capability efficiency may be increased by providing for integrated, distributed, decentralized computing units. By using decentralized processing to avoid each platform/unit requiring complete computational ability, the weight, volume, and complexity of each platform/unit may be reduced. Moreover, by sharing computation throughout the geographically distributed network, the abbreviation of data sets, which is often required by local platform/unit processing, may be avoided. This may increase the accuracy and/or reliability of information communicated over the network.

It should be understood, of course, that the foregoing relates to exemplary embodiments of the disclosure and that modifications may be made without departing from the spirit and scope of the disclosure as set forth in the following claims.

I claim:

1. A computing network comprising:
at least one free-space dynamic memory unit for storing data;
at least one free-space processing unit for processing the data stored by the at least one free-space dynamic memory unit into information;
at least one free-space static memory unit for providing operational instructions to the at least one free-space dynamic memory unit and to the at least one free-space processing unit; and
at least one free-space communications link connecting in the free-space said at least one free-space dynamic memory unit, said at least one free-space processing unit, and said at least one free-space static memory unit;
wherein each of the at least one free-space dynamic memory unit, the at least one free-space processing unit, and the at least one free-space static memory unit are decentralized, geographically distributed, and entirely disposed in free-space, defined as air or space, and are each configured to simultaneously communicate over the at least one free-space communications link to form a geographically distributed computer network which shares computation throughout the geographically distributed computer network;
wherein the at least one free-space dynamic memory unit, the at least one free-space processing unit, and the at least one free-space static memory unit each comprise:
(1) at least one of: (i) a transducer; or (ii) a transmitter and a receiver; and
(2) at least one tracking device.

2. The computing network of claim 1 further comprising at least one free-space sensor, wherein the at least one free-space communications link connects in the free-space the at least one free-space sensor to the at least one free-space dynamic memory unit, the at least one free-space processing unit, or the at least one free-space static memory unit.

3. The computing network of claim 2 wherein the at least one free-space sensor comprises at least one of an imaging sensor or a spectral sensor.

4. The computing network of claim 2 wherein the at least one free-space dynamic memory unit receives the data from the at least one free-space sensor, the at least one free-space communications link, the at least one free-space static memory unit, or the at least one free-space processing unit.

5. The computing network of claim 4 wherein the data comprises at least one of target data acquired by the at least one free-space sensor, or the operational instructions provided by the at least one free-space static memory unit.

6. The computing network of claim 1 wherein said at least one free-space communications link comprises at least one of an optical laser or a radio frequency link.

7. The computing network of claim 1 wherein the at least one tracking device comprises at least one of a tracking device transducer, a tracking device transmitter, a tracking device receiver, or integrated mechanical and electrical subsystems for at least one of passively or actively controlling operation of the at least one tracking device.

8. The computing network of claim 1 wherein the at least one of (i) the transducer; or (ii) the transmitter and the receiver are for at least one of transmitting or receiving, over the at least one free-space communications link, at least one of the operational instructions, the data, the information, a signal from the at least one tracking device, or free-space sensor data.

9. The computing network of claim 1 wherein the at least one tracking device is for tracking the at least one free-space static memory unit, the at least one free-space processing unit, the at least one free-space dynamic memory unit, or at least one free-space sensor.

10. A method of forming and using a computing network comprising:
providing at least one free-space dynamic memory unit, at least one free-space processing unit, and at least one free-space static memory unit, wherein the at least one free-space dynamic memory unit, the at least one free-space processing unit, and the at least one free-space static memory unit each comprise: (1) at least one of: (i) a transducer; or (ii) a transmitter and a receiver; and (2) at least one tracking device;
connecting said at least one free-space dynamic memory unit, said at least one free-space processing unit, and said at least one free-space static memory unit using at least one free-space communications link so that each of the at least one free-space dynamic memory unit, the at least one free-space processing unit, and the at least one free-space static memory unit are decentralized, geographically distributed, and entirely disposed in free-space, defined as air or space, and each simultaneously communicate over the at least one free-space communications link forming a geographically distributed computer network which shares computation through the geographically distributed computer network;

storing data using the at least one free-space dynamic memory unit;

providing operational instructions, over the at least one free-space communications link using the at least one free-space static memory unit, to the at least one free-space dynamic memory unit and to the at least one free-space processing unit;

sending the data stored by the at least one free-space dynamic memory unit, over the at least one free-space communications link, to the at least one free-space processing unit; and processing the data stored by the at least one free-space dynamic memory unit into information using the at least one free-space processing unit.

11. The method of claim 10 further comprising connecting at least one free-space sensor to the at least one free-space dynamic memory unit, the at least one free-space processing unit, or the at least one free-space static memory unit using the at least one free-space communications link.

12. The method of claim 11 wherein the at least one free-space sensor comprises at least one of an imaging sensor or a spectral sensor.

13. The method of claim 11 further comprising the at least one free-space dynamic memory unit receiving the data from the at least one free-space sensor, the at least one free-space communications link, the at least one free-space static memory unit, or the at least one free-space processing unit.

14. The method of claim 13 wherein the data comprises at least one of target data acquired by the at least one free-space sensor, or the operational instructions provided by the at least one free-space static memory unit.

15. The method of claim 10 wherein said at least one free-space communications link comprises at least one of an optical laser or a radio frequency link.

16. The method of claim 10 wherein the at least one tracking device comprises at least one of a tracking device transducer, a tracking device transmitter, a tracking device receiver, or integrated mechanical and electrical subsystems for at least one of passively or actively controlling operation of the at least one tracking device.

17. The method of claim 10 further comprising the at least one of (i) the transducer; or (ii) the transmitter and the receiver at least one of transmitting or receiving, over the at least one free-space communications link, at least one of the operational instructions, the data, the information, a signal from the at least one tracking device, or free-space sensor data.

18. The method of claim 10 further comprising tracking, using the at least one tracking device, the at least one free-space static memory unit, the at least one free-space processing unit, the at least one free-space dynamic memory unit, or at least one free-space sensor.

* * * * *